United States Patent
Hsu

(10) Patent No.: US 7,532,261 B2
(45) Date of Patent: May 12, 2009

(54) PROJECTION SYSTEM WITH POLARIZATION DIRECTION ROTATING MEMBER

(75) Inventor: Chien-Wen Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/937,394

(22) Filed: Nov. 8, 2007

(65) Prior Publication Data
US 2009/0015734 A1 Jan. 15, 2009

(30) Foreign Application Priority Data
Jul. 13, 2007 (CN) .................. 2007 1 0201077

(51) Int. Cl.
*G02F 1/1335* (2006.01)

(52) U.S. Cl. .................. 349/5; 349/9; 349/96

(58) Field of Classification Search .............. 349/1, 349/5, 6, 7, 9, 96; 353/20, 37, 38, 97, 98; 359/495, 485; 348/E9.027
See application file for complete search history.

(56) References Cited

U.S. PATENT DOCUMENTS

| | | | | |
|---|---|---|---|---|
| 6,454,416 B2* | 9/2002 | Aoto et al. | ..................... | 349/5 |
| 6,854,851 B2* | 2/2005 | Yamasaki et al. | ............... | 349/7 |
| 6,921,171 B2* | 7/2005 | Lee et al. | ....................... | 353/31 |
| 7,086,744 B2* | 8/2006 | Tanaka | ......................... | 349/60 |
| 7,374,290 B2* | 5/2008 | Sato | ....................... | 348/E5.139 |
| 2002/0140905 A1* | 10/2002 | Ouchi et al. | .................... | 349/5 |
| 2004/0174502 A1* | 9/2004 | Tanaka | ........................ | 353/100 |
| 2005/0213052 A1* | 9/2005 | Keith et al. | .................... | 353/94 |
| 2006/0061712 A1* | 3/2006 | Abe | ................ | 349/5 |
| 2006/0092513 A1* | 5/2006 | Momoki | ..................... | 359/486 |
| 2007/0058251 A1* | 3/2007 | Momoki et al. | ............. | 359/486 |

* cited by examiner

*Primary Examiner*—James P Hughes

(57) ABSTRACT

An exemplary projection system includes a light source unit, a polarization direction rotating member, a polarization direction restoration polarizer, an LCD panel, and a projection lens. The light source unit is configured for emitting polarized light with a first polarization direction along an axis. The polarization direction rotating member includes a solid body and a through hole defined in the solid body. The polarized light has a first portion incident on the solid body and a second portion passing through the through hole. The polarization direction rotating member is configured for rotating the first polarization direction of the first portion to a second polarization direction and allowing the second portion to pass the through hole with the first polarization direction kept unchanged. The polarization direction restoration polarizer is configured for changing the second polarization direction of the first portion to the first polarization direction.

14 Claims, 6 Drawing Sheets

PROJECTION SYSTEM WITH POLARIZATION DIRECTION ROTATING MEMBER

BACKGROUND

1. Technical Field

The invention relates to projection technology and, particularly, relates to a projection system for use in liquid crystal based projectors.

2. Description of Related Art

Referring to FIG. 5, a liquid crystal based projector 99, such as liquid crystal display (LCD) projector or liquid crystal on silicon (LCoS) projector, typically includes a light source unit 98, and a liquid crystal panel 97 (e.g., LCD panel or LCoS panel). The light source unit 98 includes a light source 981 and a condensing lens 982 for collecting and directing light from the light source 981 onto the LCD panel for modulation to produce a projection image.

Also referring to FIG. 6, the result of an experiment that was conducted to determine how a contrast value of the projection image varies with an incidence angle α of the beam of polarized light directed onto the liquid crystal panel 97 is shown. It can be inferred that contrast degradation of the projection image is mainly caused by polarized light with large incidence angle. Therefore, high contrast of the projection image can be achieved by reducing the incidence angle α. In the art, an aperture is employed to reduce the size of the beam of polarized light 95 to reduce the incidence angle α. However, this aperture will also reduce brightness of the projection image.

Therefore, it is desirable to provide a projection system for use in the liquid crystal based projector, which can overcome the abovementioned problems.

SUMMARY

In a present embodiment, a projection system includes a light source unit, a polarization direction rotating member, a polarization direction restoration polarizer, an LCD panel, and a projection lens. The light source unit is configured for emitting polarized light with a first polarization direction along an axis. The polarizer altering member, the polarization direction restoration polarizer, the LCD panel, and the projection lens are arranged along the axis so that the polarized light is collected and directed onto the LCD panel for modulating and is projected by the projection lens to produce a projection image. The polarization direction rotating member includes a solid body and a through hole defined in the solid body. The polarized light has a first portion incident on the solid body and a second portion passing through the through hole. The polarization direction rotating member is configured for rotating the first polarization direction of the first portion to a second polarization direction and allowing the second portion to pass the through hole with the first polarization direction kept unchanged. The polarization direction restoration polarizer is configured for changing the second polarization direction of the first portion to the first polarization direction.

BRIEF DESCRIPTION OF THE DRAWINGS

Many aspects of the present projection system should be better understood with reference to the following drawings. The components in the drawings are not necessarily drawn to scale, the emphasis instead being placed upon clearly illustrating the principles of the present projection system. Moreover, in the drawings, like reference numerals designate corresponding parts throughout the several views.

DETAILED DESCRIPTION OF THE EMBODIMENTS

Embodiments of the present projection system will now be described in detail with references to the drawings.

Figure 1:
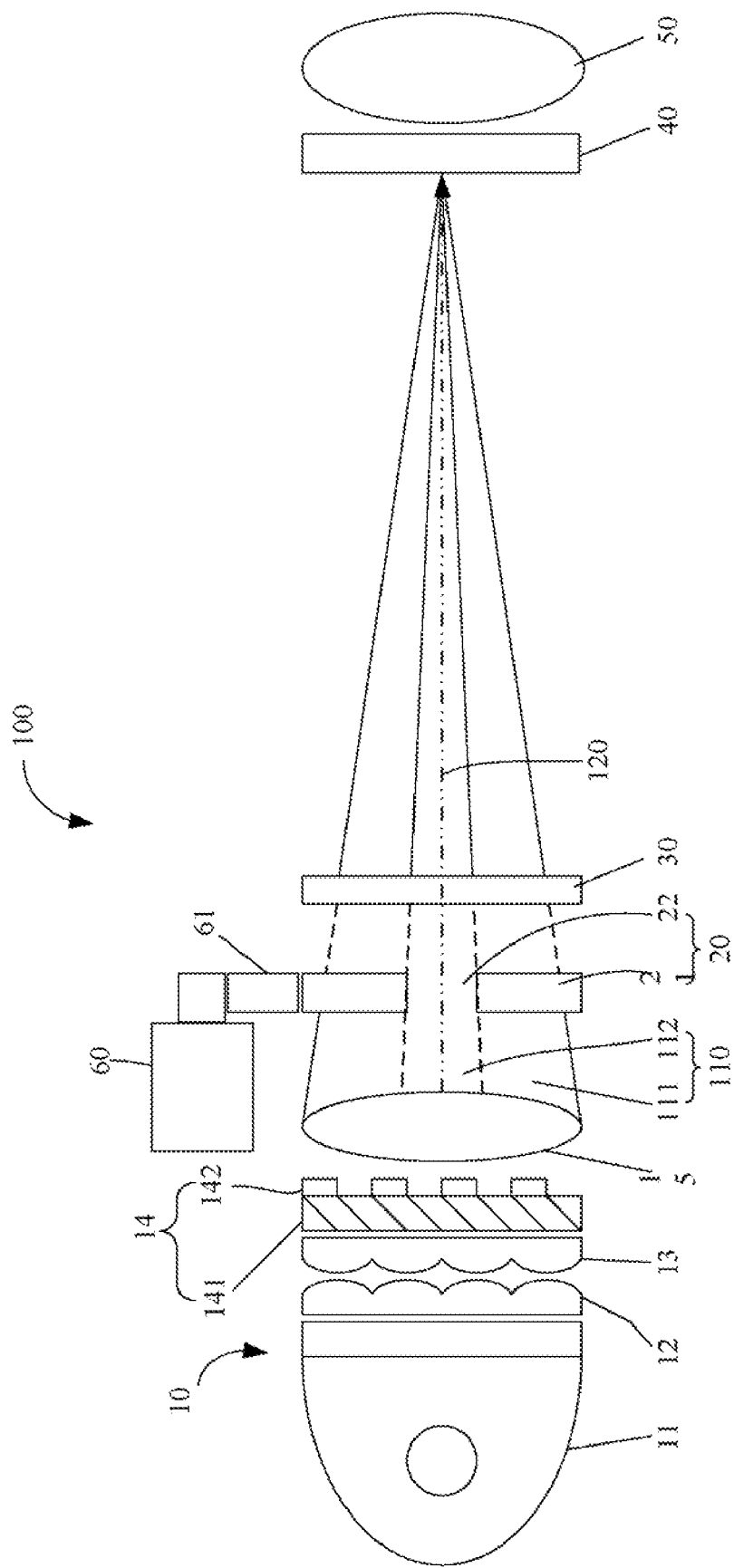
FIG. 1 is a schematic view of a projection system according to a first embodiment.

Referring to FIG. 1, a projection system 100 according to a first embodiment includes a light source unit 10, a polarization direction rotating member 20, a polarization direction restoration polarizer 30, an LCD panel 40, and a projection lens 50. The light source unit 10 is configured for emitting polarized light 110 with a first polarization direction along an axis 120. The polarizer altering member 20, the polarization direction restoration polarizer 30, the LCD panel 40, and the projection lens 50 are arranged along the axis 120 so that the polarized light 110 is collected and directed onto the LCD panel 40 for modulating and is projected by the projection lens 50 to produce a projection image (not shown). The polarization direction rotating member 20 includes a solid body 21 and a through hole 22 defined in the solid body 21. The polarized light 110 has a first portion 111 incident on the solid body 21 and a second portion 112 passing through the through hole 22. The polarization direction rotating member 20 is configured for rotating the first polarization direction of the first portion 111 to a second polarization direction and allowing the second portion 112 to pass the through hole 22 with the first polarization direction kept unchanged. The polarization direction restoration polarizer 30 is configured for changing the second polarization direction of the first portion 111 to the first polarization direction.

The light source unit 10 includes a light source 11, two lens arrays 12, 13, a polarization converter 14, and a condensing lens 15. The two lens arrays 12, 13, the polarization converter 14, and the condensing lens 15 are set along the path of light directed from the light source 11. The two lens arrays 12, 13 (known as "fly's eye lens arrays") are configured for homogenizing light from the light source 11. The polarization converter 14 includes a polarization beam splitter (PBS) array 141 and a number of half-wave plates 142. The PBS array 141 is configured for splitting light from the lens array 13 into p-polarized light and s-polarized light. The half-wave plates 142 are attached to predetermined positions of the PBS array 141 so that p-polarized light through the PBS array 141 is converted into s-polarized light. The condensing lens 15 is configured for condensing s-polarized light from the polarization converter 14, thus, s-polarized light (i.e., polarized light 110) is formed by the light source 10.

Figure 2:
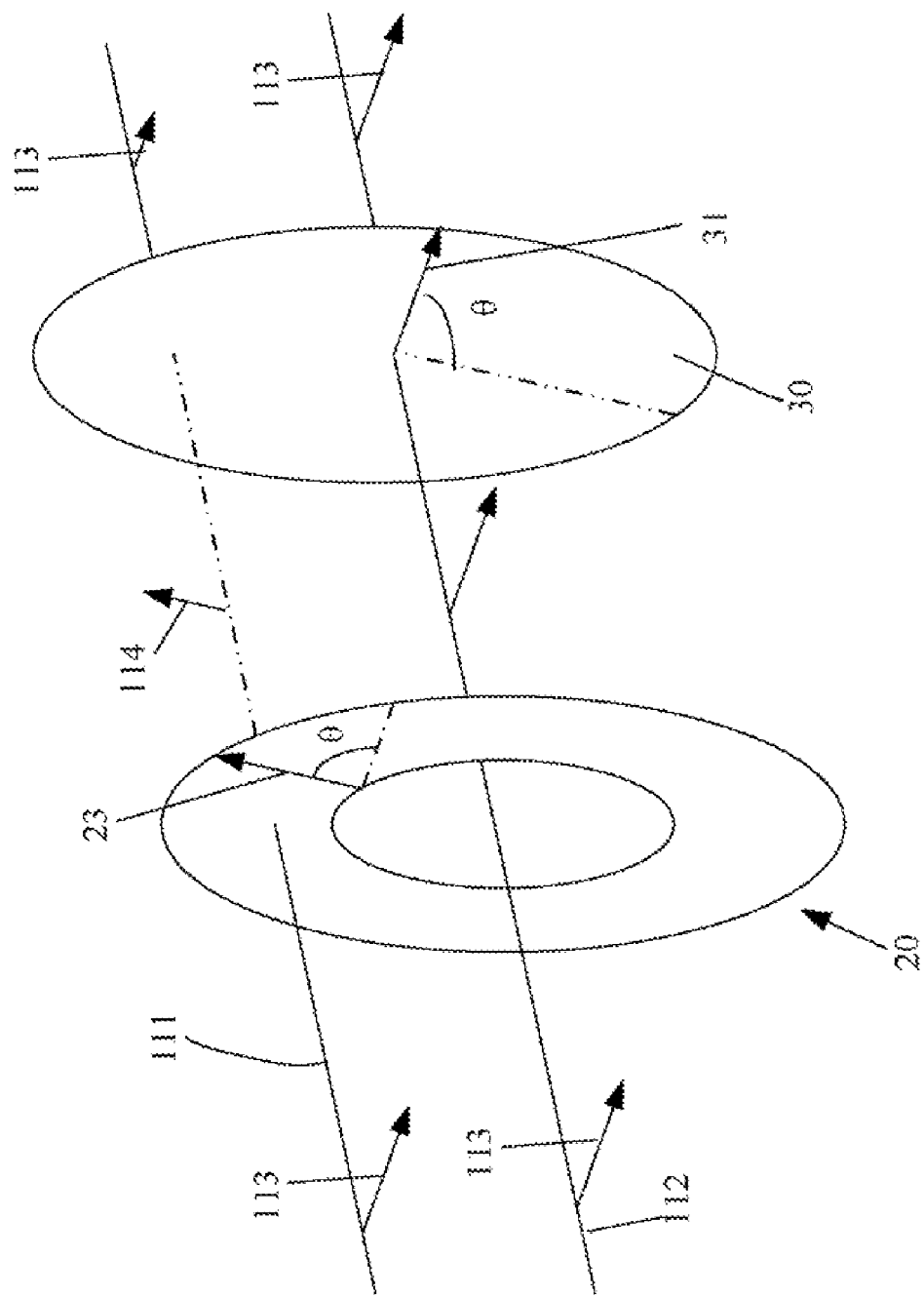
FIG. 2 is a schematic view illustrating an operation of the projection system of FIG. 1.

Also referring to FIG. 2, the polarization direction rotating member 20 of this embodiment is a disk-shaped polarizer positioned in a manner that the transmissive direction 23 thereof lies within a plane essentially perpendicular to the axis 120, and is beneficially revolvable about the axis 120 so as to rotate the first polarization direction 113 to a desirable second polarization direction 114. Opportunely, an actuator 60, e.g., motor, is employed for driving the polarization direction rotating member 20 to rotate. In this embodiment, the actuator 60 is coupled to the polarization direction rotating member 20 via a gear 61. The polarization direction restoration polarizer 30 is positioned in a manner that the transmissive direction 31 thereof is essentially parallel to the first polarization direction 113 to changing the second polarization direction 114 to the first polarization direction 113.

As illustrated in FIG. 2, if the polarization direction rotating member 20 is driven to a position that the transmissive direction 23 and the first polarization direction 113 define an angle θ. The luminous intensity of the first portion 111 will be attenuated to l cos$^4$θ, where l is the luminous intensity of first portion 111 before entering the polarization direction rotating member 20. But the second portion 112 escapes attenuation. Referring back to FIG. 1, the first portion 111 is directed onto the LCD panel 40 with an incidence angle larger than that of the second portion 112. Namely, the first portion 111 is the main factor of contrast degradation of the projection image but is attenuated in this embodiment. Understandably, desirable contrast and adequate brightness of the projection image can be achieved in this embodiment by positioning the polarization direction rotating member 20 to a position where the first portion 111 is befittingly attenuated. Furthermore, selectable modes like "high contrast" (high contrast but low brightness), "balanced" (balanced contrast and brightness), or "high brightness" (high brightness but low contrast) can be provided by rotating the polarization direction rotating member 20 to obtain a desirable cos$^4$θ value.

Opportunely, the outer diameter of the polarization direction rotating member 20 is larger than the illumination area of the polarized light 110 on the polarization direction rotating member 20, in other words, the polarized light 110 is collected within the polarization direction rotating member 20 to avoid any polarized light 110 escaping attenuation and entering the LCD panel 40 with large incidence angle. The ratio of the diameter of the aperture 21 to the diameter of the illumination area of the polarized light 110 on the polarization direction rotating member 20 is in an approximate range of ¼~½ to balance contrast and brightness of the projection image.

It should be noted that the projection system 100 can be applied to other types of liquid crystal based projectors, for example, an LCoS projector using an LCoS panel.

Figure 3:
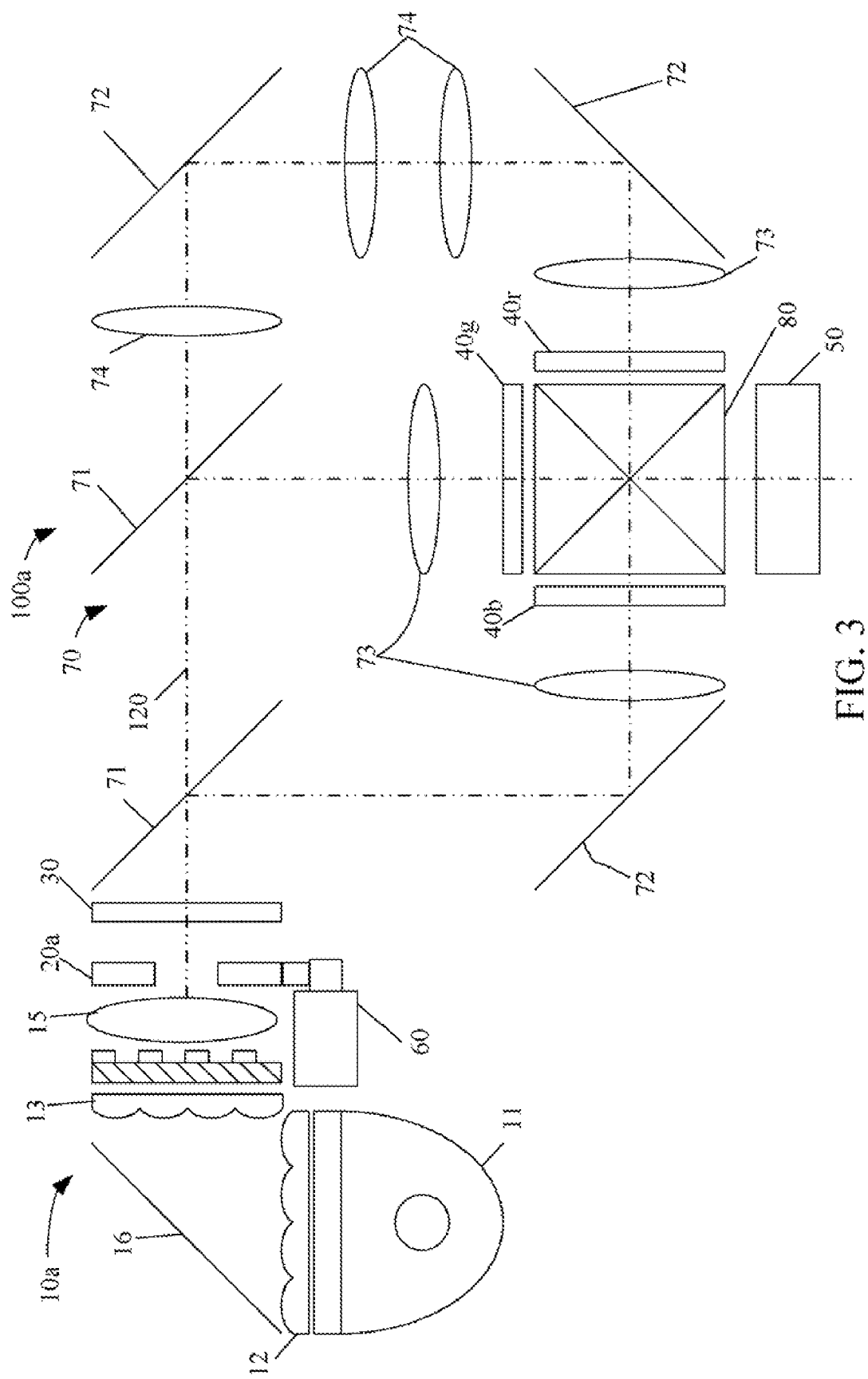
FIG. 3 is a schematic view of a projection system according to a second embodiment.

Referring to FIG. 3, a projection system 100a according to a second embodiment includes a light source unit 10a, a polarization direction rotating member 20a, the actuator 60, the polarization direction restoration polarizer 30, a color splitting subsystem 70, three LCD panels 40r, 40g, 40b, a color combiner 80, and the projection lens 50. The light source unit 10a is essentially similar to the light source unit 10 but further including a reflective mirror 16 interposed between the two lens arrays 12, 13 to change the path of light from the light source 11 to reduce the size of the projection system 100a. The polarization direction rotating member 20a, the polarization direction restoration polarizer 30, the color splitting subsystem 70 is set along the axis 120. The polarization direction rotating member 20a is a disk-shaped half-wave plate positioned so that the optical axis thereof lies within the plane essentially perpendicular to the axis 120. The color splitting subsystem 70 is configured for splitting polarized light from the polarization direction restoration polarizer 30 into three beams of color light, for example red (R) light, green (G) light, and blue (B) light, and steering each beam of color light to move along a respective color channel/path. Each LCD panel 40r/g/b is configured for modulating a respective beam of color light in the respective color channel to form a respective beam of modulated light. The color combiner 80, e.g., a prism (e.g., X-cube), is configured for combining the three beams of modulated light to form a beam of combined light and directing the beam of combined light to the projection lens 50 to produce the projection image.

In particular, the color splitting subsystem 70 includes a series of color splitting members 71, e.g., dichroic mirror, and light steering members 72, e.g., reflective mirror or prism. The color splitting members 71 and the light steering members 72 are arranged so as to split the polarized light from the polarization direction restoration polarizer 30 into the three beams of color light and to steer each beam of colored light to move along the respective color channel. More specifically, a series of condensing lenses 73 and relay lenses 74 are arranged in the light splitting subsystem 70 for light condensing and light relaying.

Figure 4:
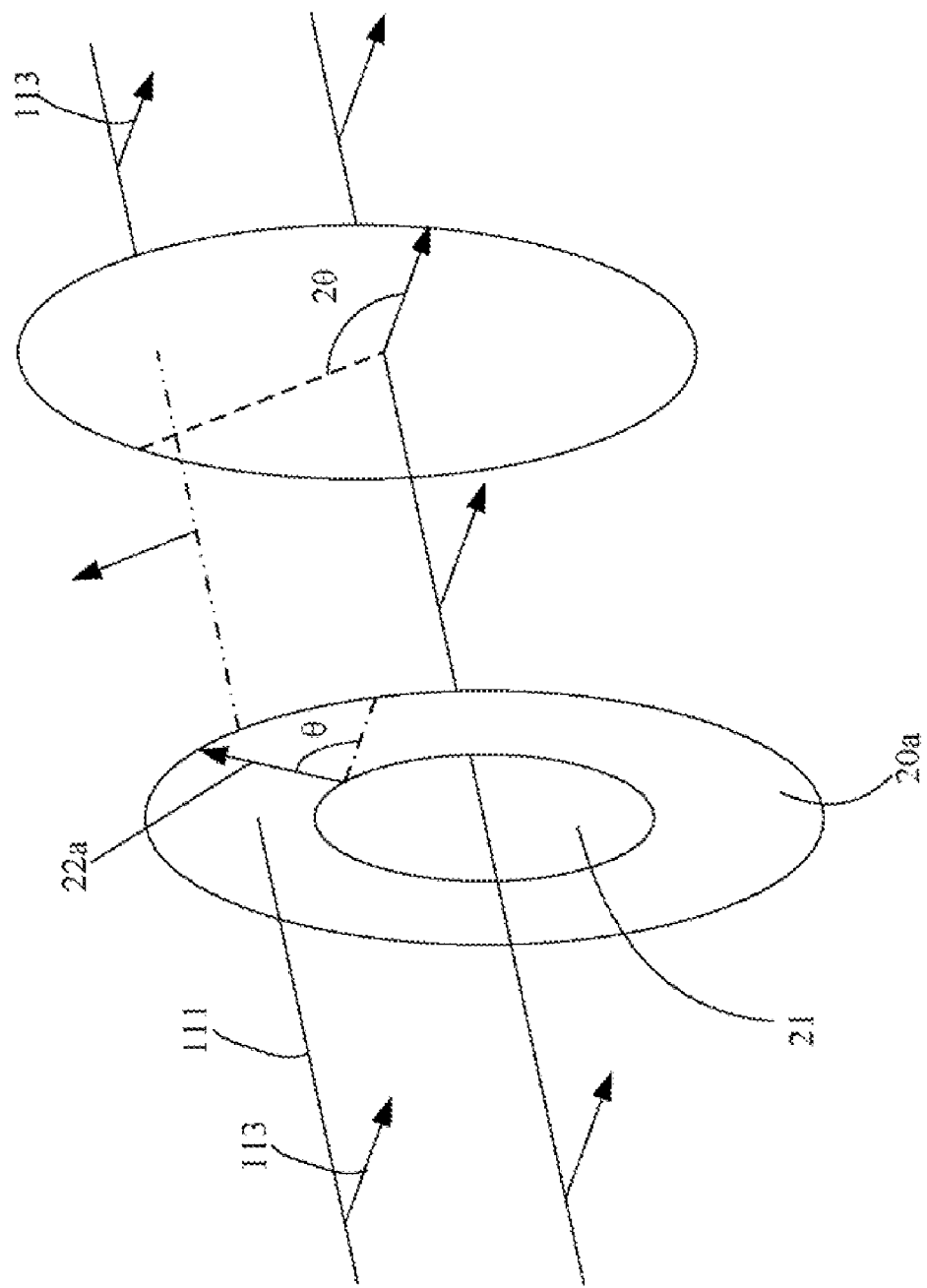
FIG. 4 a schematic view illustrating an operation of the projection system of FIG. 3.
Figure 5:
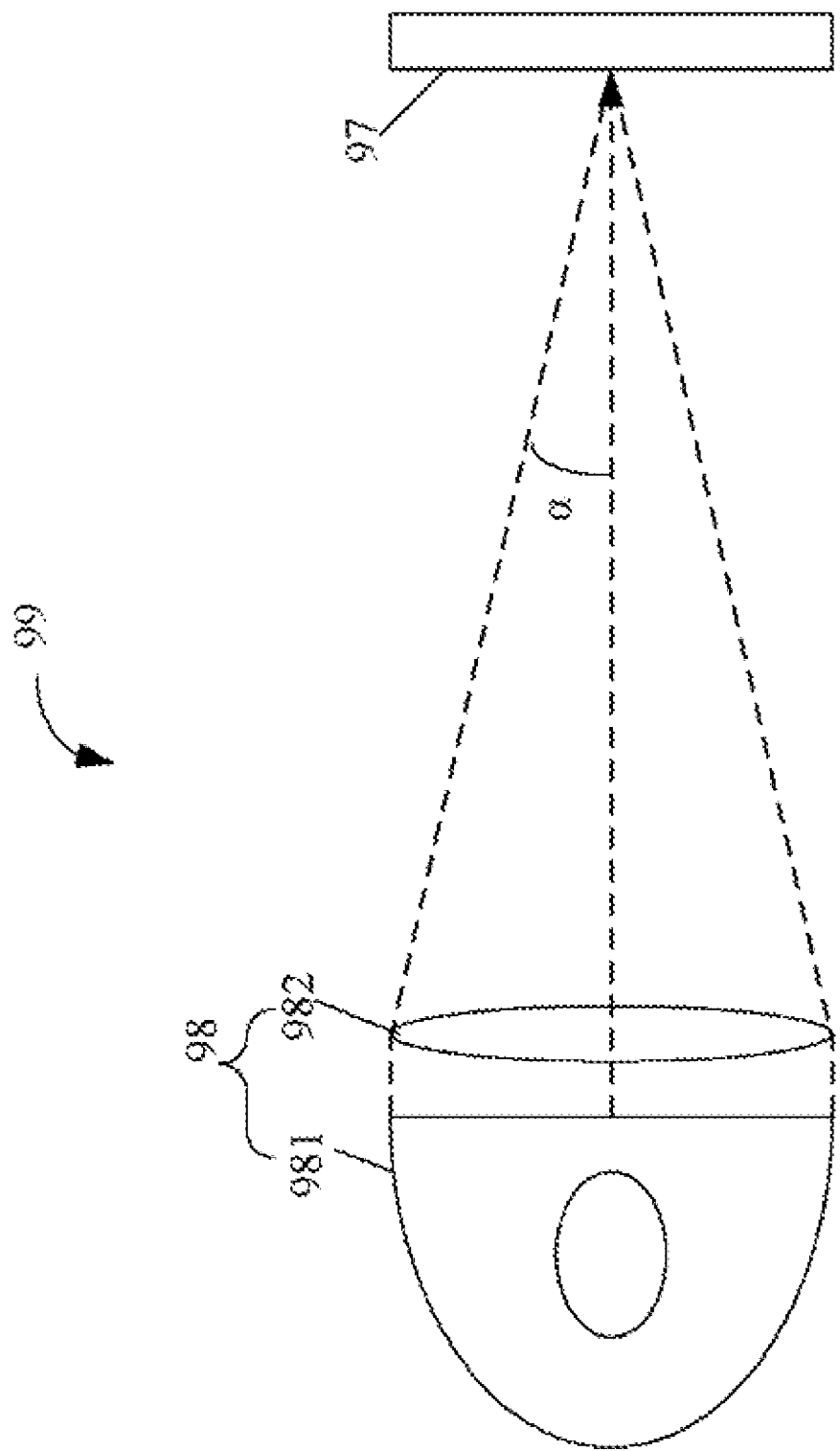
FIG. 5 a schematic view of a projection system of related art.
Figure 6:
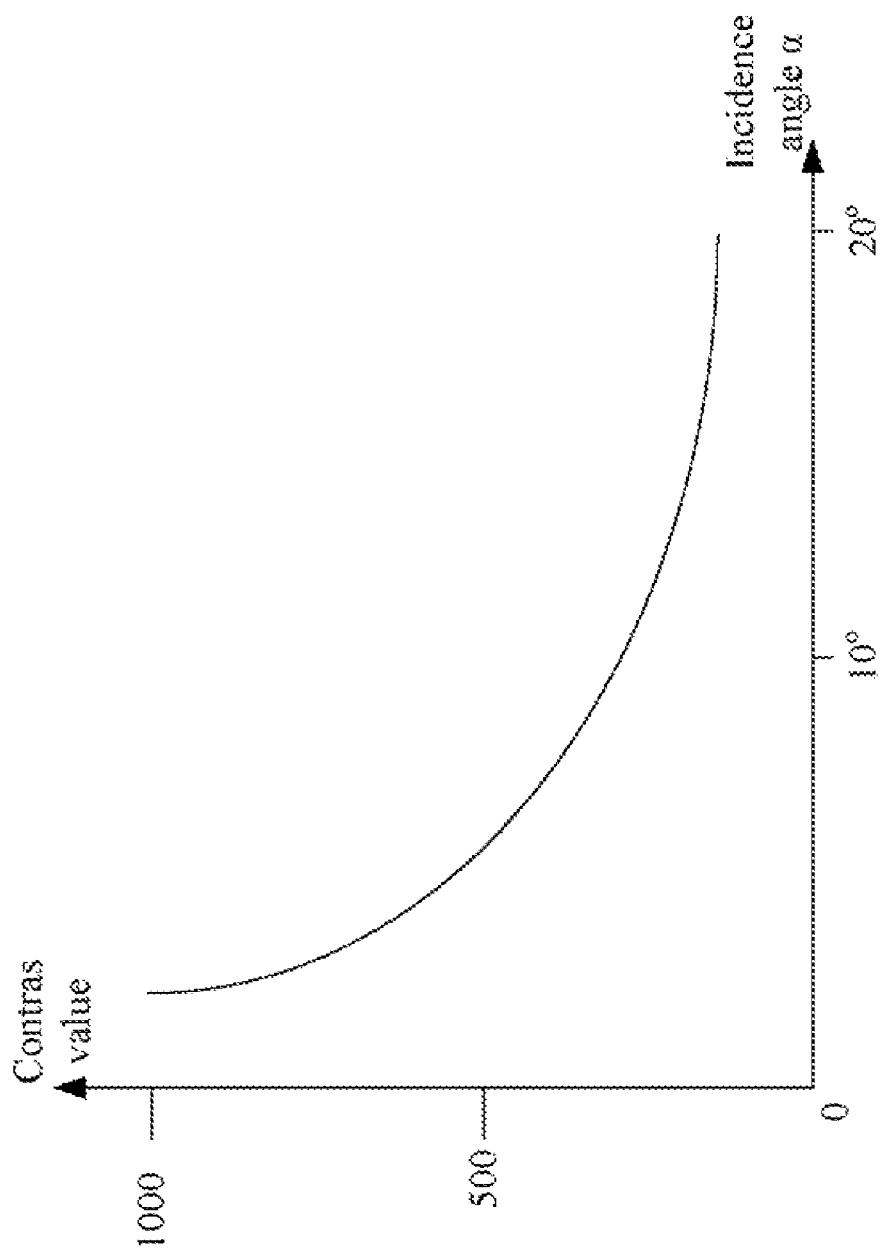
FIG. 6 is a graph showing a relationship between a contrast value of a projected image generated by the projection system of FIG. 5 and an incidence angle of a beam of light directed onto a liquid crystal panel of the projection system.

Referring to FIG. 4, in this embodiment, if the polarization direction rotating member 20a is driven to a position that the optical axis 22a thereof and the first polarization direction 113 define the angle θ, the luminous intensity of the first portion 111 is attenuated to l cos$^2$(2θ).

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A projection system comprising:
   a light source unit for emitting polarized light with a first polarization direction along an axis;
   a liquid crystal panel;
   a projection lens; the liquid crystal panel and the projection lens being set along the axis associated with the polarized light;
   a polarization direction rotating member interposed between the light source unit and the liquid crystal panel, the polarization direction rotating member having a solid body and a through hole defined in the solid body, the polarized light having a first portion incident on the solid body of the polarization direction rotating member and a second portion passing through the through hole thereof, the polarization direction rotating member being configured for rotating the first polarization direction of the first portion of the polarized light to a second polarization direction and allowing the second portion of the polarized light to pass therethrough with the polarization direction thereof kept unchanged; and
   a polarization direction polarization direction restoration polarizer interposed between the polarization direction rotating member and the liquid crystal panel, the polarization direction polarization direction restoration polarizer being configured for changing the second polarization direction of the first portion of the polarized light transmitting therethrough to the first polarization direction.

2. The projection system as claimed in the claim 1, wherein the light source unit comprises:
   a light source for emitting light;
   two lens arrays set along the axis for light homogenization;
   a polarization converter for converting light emitted from the two lens arrays into the polarized light; and a condensing lens for condensing the polarized light emitted from the polarization converter along the axis.

3. The projection system as claimed in the claim 1, wherein the liquid crystal panel is selected from a group of liquid crystal display panel and liquid crystal on silicon panel.

4. The projection system as claimed in the claim 1, wherein the polarization direction rotating member is a disk-shaped polarizer with the transmissive direction thereof being located within a plane essentially perpendicular to the axis associated with the polarized light.

5. The projection system as claimed in the claim 1, wherein the polarization direction rotating member is a disk-shaped half-wave plate having an optical axis thereof located within a plane essentially perpendicular to the axis associated with the polarized light.

6. The projection system as claimed in the claim 1, wherein the polarization direction rotating member is revolvable about the axis associated with the polarized light for adjustably rotating the first polarization direction of the first portion of the polarized light to a desirable polarization direction.

7. The projection system as claimed in the claim 1, further comprising an actuator for driving the polarization direction rotating member to rotate about the axis.

8. The projection system as claimed in the claim 1, wherein the diameter ratio of the diameter of the through hole to solid body is in an approximate range of $1/4 \sim 1/2$.

9. The projection system as claimed in the claim 1, further comprising:
a color splitting subsystem for splitting the polarized light emitted from the polarization direction polarization direction restoration polarizer into three beams of color light and directing each beam of the color light to travel along a respective color channel;
another two liquid crystal panels; each of the liquid crystals being configured for modulating the respective beam of the color light in the respective color channel to form a respective beam of modulated light; and
a color combiner for combining the three beams of modulated color light to form a beam of combined light and directing the beam of combined light to the projection lens.

10. The projection system as claimed in the claim 9, wherein the color splitting subsystem comprise:
a plurality of color splitting members for splitting the polarized light from the polarization direction restoration polarizer into three beams of color light; and
a plurality of light directing members for directing each beam of color light to move along the respective color channel.

11. The projection system as claimed in the claim 10, wherein the color splitting member is a dichroic mirror.

12. The projection system as claimed in the claim 10, wherein the light directing member is selected from a group of reflective mirrors and prisms.

13. The projection system as claimed in the claim 10, wherein the color splitting subsystem further comprises:
a plurality of condensing lenses arranged for light condensing; and
a plurality of relay lenses arranged for light relaying.

14. The projection system as claimed in the claim 9, wherein the color combiner is a prism.

* * * * *